Patented Aug. 12, 1952

2,606,937

UNITED STATES PATENT OFFICE 2,606,937

MANUFACTURE OF DICHLORODIFLUOROMETHANE

John D. Calfee, Manhasset, N. Y., and Lee B. Smith, Woodbridge, N. J., assignors to Allied Chemical & Dye Corporation, New York, N. Y., a corporation of New York No Drawing. Application June 22, 1949, Serial No. 100,763

1 Claim. (Cl. 260—653)

This invention relates to manufacture of dichlorodifluoromethane ($CCl_2F_2$) from readily available raw materials.

Due to the valuable properties, including volatility and non-inflammability, possessed by $CCl_2F_2$, this material has found application in industry as a refrigerant and also as an insecticide dispersant. Accordingly, $CCl_2F_2$ is considered a valuable and potentially more valuable material and its production by simplified high capacity and inexpensive means, has been the subject of much attention in the field of industrial chemistry.

The principal object of this invention is provision of a high yield process for preparation of $CCl_2F_2$ which process is characterized by minimum occurrence of side reactions. A further important object is to devise a method which results in substantially decreased formation of undesired non-fluorinated reaction products, and thereby makes possible a corresponding increase in reactor capacity, i. e. high rate of formation of sought-for $CCl_2F_2$ per unit volume of reactor. A still further object is provision of high yield single step procedure for manufacture of $CCl_2F_2$.

It has been found that the foregoing objects may be accomplished by subjecting vinylidene fluoride, a readily available material, to temperature not less than 550° C. and not more than 950° C. in the presence of certain suitable amounts of chlorine and recovering the sought-for $CCl_2F_2$ from the resulting reaction mixture. According to the invention method, vinylidene fluoride is caused to undergo chlorinolysis resulting in the rupture of the carbon to carbon linkage, saturation of all of the carbon valences with halogen atoms, and formation of $CCl_2F_2$.

In addition to the primarily sought-for $CCl_2F_2$, trichlorofluoromethane ($CCl_3F$), carbon tetrachloride ($CCl_4$) and tetrachloroethylene ($C_2Cl_4$) are also produced. $CCl_3F$, $CCl_4$ and $C_2Cl_4$ are also commercially important chemicals, the first material being used in insecticide and fire extinguisher propellants and refrigerants, and the last two materials being well known as valuable dry cleaning agents. Particularly with respect to production of $CCl_2F_2$ and $CCl_4$, the reaction effected may be represented by the following equation:

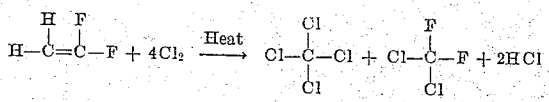

According to the procedure of the invention, yields of $CCl_2F_2$ of 80% and above, based on vinylidene fluoride charged, may be obtained. Further, recoveries of fluorine as $CCl_2F_2$ and $CCl_3F$ of 95% and above, based on vinylidene fluoride, are usual in preferred procedures. Selective formation of $CCl_2F_2$ in such high yields from an unsaturated starting material such as vinylidene fluoride, particularly under the conditions prevailing, e. g. elevated temperature, is contrary to expectation, since unsaturated compounds are often known to polymerize when subjected to such extreme conditions.

The process may be carried out in a tubular reactor of suitable length, equipped at one end with pipe connections facilitating introduction into the reactor of the desired proportions of raw materials and at the outlet end with a gas off-take pipe for conducting the exhaust gas to the products recovery system. The reactor is provided with an external heating jacket together with means for maintaining control of temperatures within the reactor. The reaction preferably should be carried out in the absence of catalysts such as active carbon and compounds of silicon. Hence, the reactor is preferably made of a neutral or non-catalytic material such as graphite.

The process is readily adaptable to a continuous operation in which the vinylidene fluoride and chlorine are continuously introduced into a reaction zone, subjected therein to the hereinafter described temperature conditions and the resulting reactant mixture continuously discharged from the reaction zone.

$CCl_2F_2$ is the preferred sought-for end product of the present process and accordingly the reaction is carried out in the presence of sufficient chlorine to obtain appreciable amounts of $CCl_2F_2$, substantial quantities of such product being obtainable when at least 3 molecular portions of chlorine per mol of vinylidene fluoride are introduced into the reaction zone. However, it has been found that in order to obtain good yields of $CCl_2F_2$, enhance selective formation of $CCl_2F_2$ relative to $CCl_3F$, and to minimize formation of unwanted by-products of the chlorinolysis reaction, not less than 3.5 molecular portions of chlorine should be charged to the reactor with the vinylidene fluoride. For best overall results, it is preferred to use about four molecular portions of chlorine. While greater amounts of chlorine may be used without adversely affecting yield of $CCl_2F_2$, excessive amounts of chlorine may cause more difficult product separation and purification. We find that when the molecular portion of chlorine to vinylidene fluoride is in excess of 4.5, difficulties in separation of chlorine from product may cause economic disadvantages and, accordingly, we prefer to maintain molar chlorine ratios not substantially above 4.5.

We find that exhaustive chlorinolysis of vinylidene fluoride may be effected by maintaining temperature in the reactor not less than 550° C. and not more than 950° C. While chlorinolysis takes place at temperatures above 550° C., higher temperatures are desirable to substantially initiate and maintain the reaction. Temperatures not less than about 775° C. are preferred and the preferred operating range is 775° to 850° C. Temperatures above about 950° C. serve no useful purpose and should be avoided to prevent unnecessary decomposition.

Assuming the presence in the reaction zone of sufficient chlorine to substitute for all of the hydrogen atoms of the vinylidene fluoride and to support chlorinolysis, exhaustive chlorinolysis takes place rapidly and the gas stream may be passed through the reactor at any suitable rate. Conversion of vinylidene fluoride is appreciably dependent upon space velocity per hour, the term "conversion" indicating the percentage of starting material which reacts during the course of the reaction. Space velocity per hour should be ordinarily not more than 3000. When operating in the preferred temperature range 775–850° C., we find that most advantageous results are insured when space velocity is maintained in the range of approximately 350–1000 S. V. H. From the above chemical equation, it is noted that for each volume of vinylidene fluoride reactant there are formed only two volumes of by-product HCl. This affords higher rate of throughput of vinylidene fluoride at a given space velocity and, accordingly, a higher reactor capacity. The high capacity is a particular advantage of our process.

The exit gas of the reactor comprises principally $CCl_2F_2$ (B. P. minus 30° C.); $CCl_3F$ (B. P. plus 23.8° C.); $CCl_4$ (B. P. plus 77° C.); $C_2Cl_4$ (B. P. plus 122° C.), and small amounts of other halogenated hydrocarbons, plus HCl and some unreacted chlorine. Such a gas may be treated in any suitable way to recover desired products. For example, the gas stream may be water washed to remove most of the hydrochloric acid, washed with mild NaOH to remove chlorine and the last traces of HCl and finally dried by use of calcium chloride or silica gel. The gas at the exit of the drying step comprises principally $CCl_2F_2$, $CCl_3F$, $CCl_4$, and $C_2Cl_4$. If desired, such gas stream may be cooled to say zero° C. to condense $CCl_3F$, $CCl_4$ and $C_2Cl_4$, and then further cooled to the temperature of Dry Ice to condense $CCl_2F_2$ and effect separation of the same from any unreacted $CH_2=CF_2$ (B. P. minus 83° C.). Thereafter the liquid mixture of $CCl_3F$, $CCl_4$ and $C_2Cl_4$ may be distilled to separate and recover these materials individually. Some of the higher boiling products remain in the bottom of the water and/or NaOH scrubbers and may be recovered by suitable decantation and distillation operations. By-products such as HCl and chlorine may be recovered in any suitable way.

The following is an example of practice of the invention: Vinylidene fluoride and chlorine in molecular proportion of 1 to 4, respectively, were mixed and passed at about 400 S. V. H. through a neutral reactor (graphite tube), heated externally to maintain reaction temperature at about 810° C. The exit gases were washed with water to remove the halogen acid and with caustic soda solution to take out unreacted chlorine. The $CCl_2F_2$ in the product passed through the scrubbers and was condensed in a trap immersed in a Dry Ice-acetone bath. In this operation the higher boiling materials, i. e. $C_2Cl_4$ and $CCl_4$ and a small amount of dissolved $CCl_3F$, condensed in the water scrubber and were recovered therefrom. The reaction products were separated into several constituents by fractional distillation. From 100 molar parts of vinylidene fluoride there were recovered 82.7 molar parts of $CCl_2F_2$, 26.0 mols of $CCl_3F$, 24.3 mols of $CCl_4$ and 18.7 mols of $C_2Cl_4$. 95% of the fluorine introduced into the reactor was recovered in the form of $CCl_2F_2$ and $CCl_3F$. In this operation yield of $CCl_2F_2$ was about 82%, the term yield being used to denote the percent of $CH_2=CF_2$ input which is recovered as $CCl_2F_2$ (based on fluorine recovery).

We claim:

The process which comprises continuously introducing vinylidene fluoride and not less than 3.5 and not more than 4.5 molecular proportions of chlorine into a reaction zone at space velocity per hour in the range 350–1000, heating said vinylidene fluoride in said zone at temperature not less than 775° C. and not more than 850° C. in the presence of said chlorine forming a product mixture comprising not less than about 0.75 mols of dichlorodifluoromethane per mol of introduced vinylidene fluoride, continuously withdrawing said product mixture from said zone and recovering dichlorodifluoromethane from said product mixture.

JOHN D. CALFEE.
LEE B. SMITH.

REFERENCES CITED

The following references are of record in the file of this patent:

UNITED STATES PATENTS

| Number | Name | Date |
| --- | --- | --- |
| 2,417,059 | Calfee et al. | Mar. 11, 1947 |
| 2,442,324 | Heitz et al. | May 25, 1948 |